Oct. 20, 1953 A. E. SHAPIRO ET AL 2,655,738
SIGHT READING DEVICE
Filed June 13, 1952
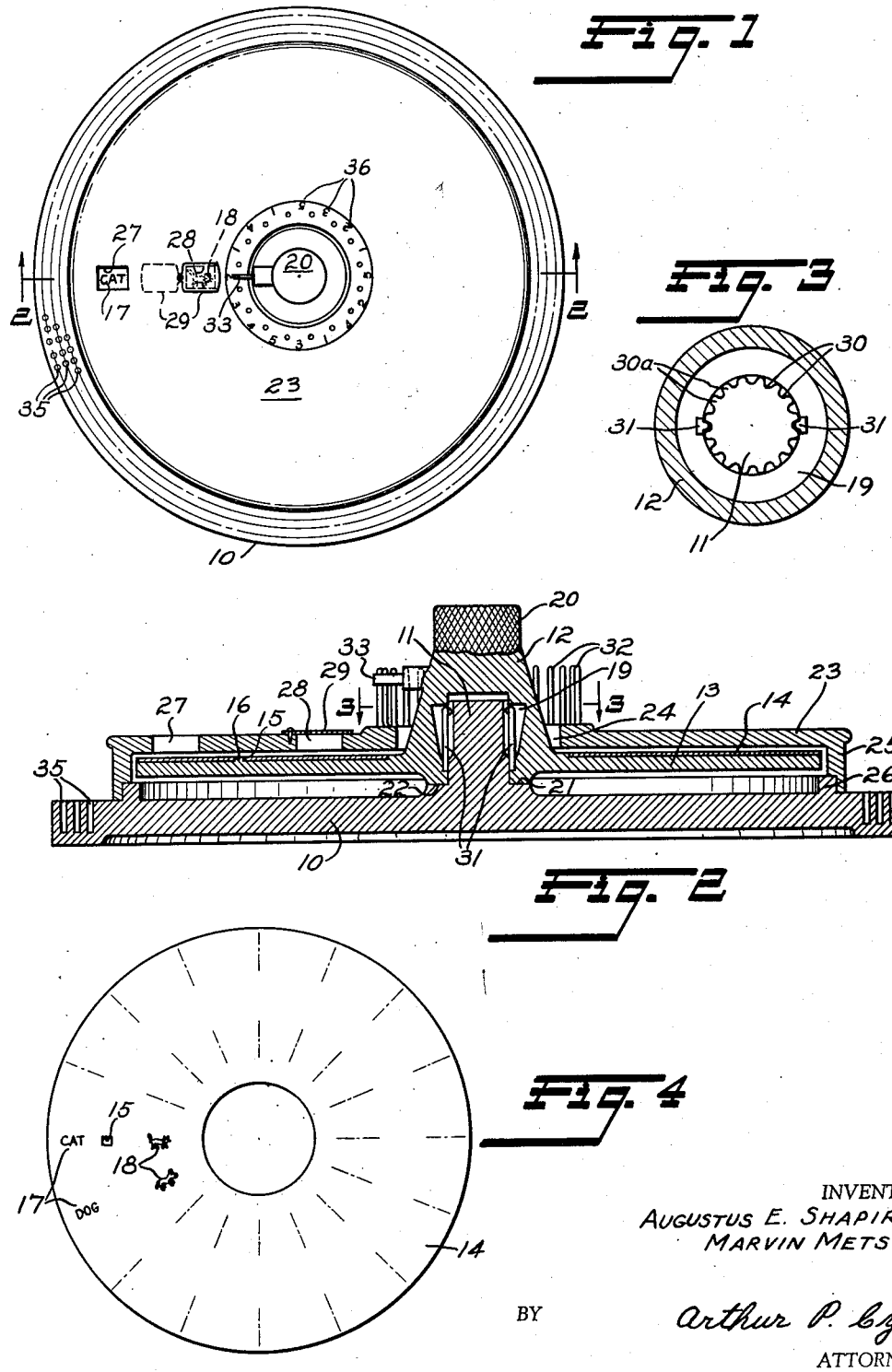
INVENTORS
AUGUSTUS E. SHAPIRO
MARVIN METSKY
BY Arthur P. Cyr
ATTORNEY Patented Oct. 20, 1953

2,655,738

UNITED STATES PATENT OFFICE 2,655,738

SIGHT READING DEVICE

Augustus E. Shapiro and Marvin Metsky,
Newark, N. J.

Application June 13, 1952, Serial No. 293,278

5 Claims. (Cl. 35—35)

This invention relates to educational toys and is directed more particularly to a reading aid type of toy, it being an object of our invention to facilitate and make interesting the learning of a basic sight vocabulary by direct association of the name of an object with an illustration of the object.

Another purpose of the present invention is the provision of an educational toy of this character which is simple and safe for a child to operate and which is both interesting and instructive in that by simple manipulation a word is exposed to view through a window opening in the toy and an illustration of the object associated with the word is adapted to be exposed through a separate window opening which is normally closed by a movable shutter.

Still another object of our invention is the provision of a reading aid type of toy of novel and improved construction in which the name of an object and the illustration of the object are printed or otherwise reproduced on an indicia card carried by a rotatable disc mounted in a housing, the housing having separate window openings for exposing to view the name of an object and the illustration of the object, one of said window openings being normally closed by a movable shutter or lid.

The above and other objects together with the advantages of our invention will become more apparent from the following detailed description when taken in conjunction with the accompanying drawing which illustrates by way of example a preferred embodiment of our invention.

In the drawing in which numerals of like character have been used to indicate similar parts throughout the several views, Fig. 1 is a top plan view of a reading aid type of toy embodying the present invention;

Fig. 2 is a sectional view taken on line 2—2 of Fig. 1;

Fig. 3 is a sectional view taken on line 3—3 of Fig. 2, and

Fig. 4 is a detail plan view of the indicia card having a series of names and a series of illustrations of the objects in association with the names.

Referring in detail to the drawing, our reading aid toy comprises a base member 10 provided centrally thereof with an upwardly extending stud or post 11 and forming a central support or axle for the annular hub 12 of a disc 13 rotatably mounted on said base member. Mounted on the disc 13 for rotation therewith is an annular indicia card 14 having a locating hole or opening 15 to receive a locating pin 16 carried by the disc. The indicia card 14 is provided on one or both of its faces with two circular rows of indicia 17 and 18 radially spaced from one another, the indicia in the outer row 17 comprising simple words such as the names of objects and the indicia in the inner row being disposed opposite the respective names in the outer row and comprising illustrations of the respective objects.

The hub 12 projects upwardly from the upper face of the disc 13 and is provided with a central bore or opening 19 to accommodate the vertical stud 11 of the base member 10. The hub 12 terminates at its upper end in a reduced knob 20, preferably knurled as shown and adapted to be turned by manipulation to rotate the disc 13 and the indicia card 14.

In order to support the disc 13 above the upper face of the base member 10 and thereby reduce to a minimum the frictional resistance between the parts, the base of the stud 11 is enlarged as shown in Fig. 2 to provide an annular shoulder or bearing 21 for cooperative engagement by a complementary annular shoulder or bearing 22 formed by the hub 12 on the underside of the disc 13. If desired spherical bearing members may be interposed between the annular shoulders 21 and 22 to reduce still further the frictional resistance between the parts.

Removably mounted on the base member 10 is an annular cover 23 having a central bore 24 to accommodate the hub 12 of the disc 13. The cover 23 has an annular peripheral flange or skirt 25 adapted to be snapped in place on an annular stud or ring 26 on the upper face of the base member 10. Adjacent one side of the bore 24, the cover 23 is provided with a pair of window openings 27 and 28 in line with the rows of indicia 17 and 18, respectively, and so dimensioned as to render visible therethrough a respective name or illustration of the associated row. Thus, as the disc 13 rotates, each of the names in the row of indicia 17 will be brought successively into registry with the window opening 27 and each of the illustrations or pictures of the objects in the row of indicia 18 will likewise be brought successively into registry with the window opening 28.

The window opening 27 is preferably uncovered so as to expose to view a respective word or name in the row of indicia 17. The window opening 28, on the other hand, is preferably normally closed or covered by a lid 29 suitably mounted on the cover 23 and adapted to be shifted manually to expose to view a respective illustration in the row of indicia 18 and associated with the respective name in the row of indicia 17.

In order to insure proper registration of the individual indicia in the rows 17 and 18 with the windows 27 and 28, respectively the stud 11 on the base member 10 is fluted for a predetermined portion of its length to provide a series of longitudinally extending grooves 30 for cooperative engagement by a pair of resilient fingers 31 of spring steel or the like carried by the hub 12 of the disc 13 and disposed on diametrically opposite sides of the bore 19 as clearly shown in Figs. 2 and 3. In this manner, during rotation of the disc 13, the fingers 31 will ride over the raised portions or ribs 30a between the grooves 30 and said fingers will drop into a pair of grooves 30 when the disc 13 comes to a stop.

Surrounding its central opening 24, the cover 23 is provided with a series of vertical arms 32 arranged in a circle for cooperative engagement by a flexible finger 33 in the form of a thin strip of plastic or the like carried by the hub 12 of the disc 13 and projecting radially outwardly therefrom. Thus, as the disc 13 rotates, the arms 32 will be engaged successively by the finger 33 to produce a musical sound for the amusement of the child.

In the operation or use of the toy, the knurled knob 20 is spun or turned to rotate the disc 13 and the indicia card 14 carried thereby. As the disc 13 rotates, the flexible finger 33 successively strikes the vertical arms 32 on the cover 23 and produces a noise or musical sound. During rotation of the disc 13, the resilient fingers 31 in the bore 19 of the hub 12 will ride over the longitudinal ribs 30a on the stud 11 and gradually reduce the speed of rotation of the disc. When the disc 13 comes to rest and the resilient fingers 31 come into engagement with two of the longitudinal grooves 30 on the stud 31, a word in the row of indicia 17 will be exposed through the window opening 27. The child then attempts to identify the word by uttering the same following which he uncovers the window opening 28 by sliding the shutter or lid 29 to verify his utterance exposing to view the picture or illustration of the word or name of the object identified.

When it is desired to change the indicia card 14 or to use the reverse side thereof having different indicia from those illustrated, the cover 23 is first removed and the same indicia card 14 lifted from the disc 13 and turned over or a different indicia card substituted therefor and set in place on the disc 13 following which the cover 23 is snapped in place on the base member 10.

In order to stimulate interest in the use of the toy and thereby achieve the educational benefits derived by the use thereof, namely, to learn a basic vocabulary by association of a word consisting of the name of an object with an illustration of the object, the base member 10 is provided adjacent its periphery with a series of peg-receiving holes 35 arranged in circular rows and each of the words or indicia on the card 14 is given a predetermined value as indicated by the series of numbers 36 disposed in the spaces between the arms 32 on the cover 23. Thus, for each word correctly identified, a peg can be moved a predetermined number of holes corresponding to the value of the correctly identified word as indicated by the number in the series 36 until the peg is moved to the starting place on the base member 10. By employing pegs of respectively different colors, two or more children can make use of the toy as a game, the first child to return to starting position being declared the winner of the game. Instead of being provided in the base member 10, the peg receiving holes 35 may be arranged in circular rows in the cover member 23 so as to reduce the diameter of the toy.

It will thus be seen that we have provided a reading aid type of toy of new and improved construction which in addition to its educational advantages has also the advantages and features of a game.

From the foregoing, it is believed that the construction and advantages of our invention will be readily understood by those skilled in the art without further description, it being borne in mind that numerous changes may be made in the details disclosed without departing from the scope of the following claims.

What we claim is:

1. A device of the class described comprising a base member having a vertical stud centrally disposed on the upper face thereof, a disc having an annular hub rotatably mounted on said stud, an indicia card carried by said disc for rotation therewith and having a series of indicia of predetermined characteristics arranged in a circular row and a second series of indicia of predetermined characteristics different from and complementary to those of said first row and arranged in a circular row radially spaced from said first row, said annular hub extending upwardly from said disc and terminating in a knob adapted to be turned to effect rotation of said disc, an annular cover member mounted on said base member having a central bore for accommodating said hub and a window opening in alignment with said first row of indicia and a second window opening in alignment with said second row of indicia, each of said window openings being so dimensioned as to expose an individual indicium of a respective row, means normally closing one of said window openings and adapted to be moved to uncover said opening, and mutually cooperating means on said stud and hub for arresting rotation of said disc with an individual indicium of each row in registration with a respective window opening.

2. A device as claimed in claim 1 wherein said mutually cooperating means comprise longitudinally extending grooves on said stud and resilient fingers on said hub.

3. A device of the class described comprising a base member, a vertical stud centrally disposed on the upper face of said base member and having an enlarged base portion with an annular shoulder spaced above the upper face of said base member, a disc having an annular hub rotatably mounted on said stud, said hub having an annular shoulder cooperating with said first named shoulder to support said disc above the upper surface of said base member, a knob on said hub adapted to be turned to rotate said disc, a cover removably mounted on said base member for enclosing said disc and having a central opening to receive said knob, an indicia card carried by said disc for rotation therewith and having a series of indicia in the form of names of objects arranged in a circular row and a second series of indicia in the form of illustrations of objects complementary to the respective names of said first row and spaced radially from said first row, said cover having a window opening in radial alignment with said first named row to render visible an individual name in said row and a second window opening in radial alignment with said second named row to render visible an individual illustration in said row complementary to the respective name in said first row, a lid normally closing said second named window opening and adapted to be moved to uncover said window, and mutually cooperating means on said stud and hub for arresting rotation of said disc with an individual indicium of each row in registration with a respective window opening.

4. A device of the class described comprising a base member, a vertical stud centrally disposed on the upper face of said base member and having an enlarged base portion with an annular shoulder spaced above the upper face of said base member, a disc having an annular hub rotatably mounted on said stud, said hub having an annular shoulder cooperating with said first named shoulder to support said disc above the upper surface of said base member, a knob on said hub adapted to be turned to rotate said disc, a cover removably mounted on said base member for enclosing said disc and having a central opening to receive said knob, an indicia card carried by said disc for rotation therewith and having a series of indicia in the form of names of objects arranged in a circular row and a second series of indicia in the form of illustrations of objects complementary to the respective names of said first row and spaced radially from said first row, said cover having a window opening in radial alignment with said first named row to render visible an individual name in said row and a second window opening in radial alignment with said second named row to render visible an individual illustration in said row complementary to the respective name in said first row, a lid normally closing said second named window opening and adapted to be moved to uncover said window, and mutually cooperating means on said tud and hub for arresting rotation of said disc with an individual name of said first row in registration with said first window opening and an individual illustration of said second row and complementary to the respective name in said first row in registration with said second window opening.

5. A device of the class described comprising a base member, a vertical stud centrally disposed on the upper face of said base member and having an enlarged base portion with an annular shoulder spaced above the upper face of said base member, a disc having an annular hub rotatably mounted on said stud, said hub having an annular shoulder cooperating with said first named shoulder to support said disc above the upper surface of said base member, a knob on said hub adapted to be turned to rotate said disc, a cover removably mounted on said base member for enclosing said disc and having a central opening to receive said knob, an indicia card carried by said disc for rotation therewith and having a series of indicia in the form of names of objects arranged in a circular row and a second series of indicia in the form of illustrations of objects complementary to the respective names of said first row and spaced radially from said first row, said cover having a window opening in radial alignment with said first named row to render visible an individual name in said row and a second window opening in radial alignment with said second named row to render visible an individual illustration in said row complementary to the respective name in said first row, a lid normally closing said second named window opening and adapted to be moved to uncover said window, a series of longitudinally extending grooves on said stud, and a pair of diametrically opposed resilient fingers carried by said hub and cooperating with said grooves for arresting rotation of said disc with an individual name of said first row in registration with said first window opening and an individual illustration of said second row and complementary to the respective name in said first row in registration with said second window opening.

AUGUSTUS E. SHAPIRO.
MARVIN METSKY.

References Cited in the file of this patent

UNITED STATES PATENTS

| Number | Name | Date |
|---|---|---|
| 947,064 | Potter | Jan. 18, 1910 |
| 1,358,698 | Beskow | Nov. 16, 1920 |
| 1,816,760 | Barnowitz | July 28, 1931 |
| 2,177,790 | Scott | Oct. 31, 1939 |
| 2,565,557 | Guimond | Aug. 28, 1951 |

FOREIGN PATENTS

| Number | Country | Date |
|---|---|---|
| 771,225 | France | Oct. 3, 1934 |